US006230409B1

(12) United States Patent
Billings et al.

(10) Patent No.: US 6,230,409 B1
(45) Date of Patent: May 15, 2001

(54) MOLDED BUILDING PANEL AND METHOD OF CONSTRUCTION

(75) Inventors: Patricia Billings, Leawood, KS (US); Susan Michalski, Lee's Summit, MO (US)

(73) Assignee: Earth Products Limited, Leawood, KS (US)

(*) Notice: Subject to any disclaimer, the term of this patent is extended or adjusted under 35 U.S.C. 154(b) by 0 days.

(21) Appl. No.: 09/052,260

(22) Filed: Mar. 31, 1998

(51) Int. Cl.[7] .................................................. B23P 17/00

(52) U.S. Cl. .................................... 29/897.32; 29/897.31; 29/897.3; 52/745.19; 264/251; 264/256; 264/277; 264/279; 264/279.1

(58) Field of Search ................................ 52/600, 745.19, 52/745.2, 79.14, 270; 249/39; 264/215, 256, 257, 253, 267, 277, 279, 279.1; 29/897.3, 897.31, 897.32, 897.34, 460, 897.312

(56) References Cited

U.S. PATENT DOCUMENTS

| | | | | |
|---|---|---|---|---|
| 1,229,365 | * | 6/1917 | Weigand | 29/897.34 |
| 1,964,816 | * | 7/1934 | Graydon | 52/600 |
| 2,007,148 | | 7/1935 | White . | |
| 2,655,710 | * | 10/1953 | Roensch et al. | 52/600 |
| 3,245,185 | | 4/1966 | Rowe . | |
| 3,435,580 | | 4/1969 | Merrill et al. . | |
| 3,611,533 | * | 10/1971 | Thomason | 29/897.34 |
| 3,760,540 | | 9/1973 | Latoria et al. . | |
| 3,885,008 | | 5/1975 | Martin . | |
| 4,304,704 | | 12/1981 | Billings . | |
| 4,453,359 | | 6/1984 | Robinson . | |
| 4,494,352 | * | 1/1985 | Leemhuis | 52/745.19 |
| 4,554,124 | | 11/1985 | Sudrabin . | |
| 4,614,013 | * | 9/1986 | Stevenson | 29/897.34 |
| 4,619,032 | * | 10/1986 | Subdrabin | 29/460 |
| 4,702,058 | | 10/1987 | Bennett . | |
| 5,055,252 | | 10/1991 | Zimmerman . | |
| 5,248,549 | | 9/1993 | Silva et al. . | |
| 5,268,137 | * | 12/1993 | Scott et al. | 264/257 |
| 5,308,572 | * | 5/1994 | Hackman | 264/257 |
| 5,507,427 | * | 4/1996 | Burgett | 52/745.19 |
| 5,524,412 | * | 6/1996 | Corl | 52/745.19 |
| 5,526,629 | | 6/1996 | Cavaness . | |
| 5,624,615 | * | 4/1997 | Sandorff | 264/251 |

* cited by examiner

*Primary Examiner*—I. Cuda Rosenbaum
*Assistant Examiner*—Trinh Nguyen
(74) *Attorney, Agent, or Firm*—Shook, Hardy & Bacon LLC

(57) ABSTRACT

A building panel constructed of a gypsum-cement-catalyst formulation molded in layers and including a rigid stud framework. The layers include surface layers, a fire resistant layer and an insulating layer, as well as reinforcement and building paper. A modified panel is molded in layers with structural strength provided by a grid providing spaced apart wire panels. The panel is constructed by a method that includes applying a fluid material of gypsum and cement into a mold having a removable base. Reinforcing mesh and a rigid framework are inserted into the mold along with building paper and reinforcement which are secured to the framework. Additional gypsum and cement are then applied to cover the framework after setting. The base is removed and the initial layer of gypsum and cement is mechanically fastened to the framework.

19 Claims, 4 Drawing Sheets

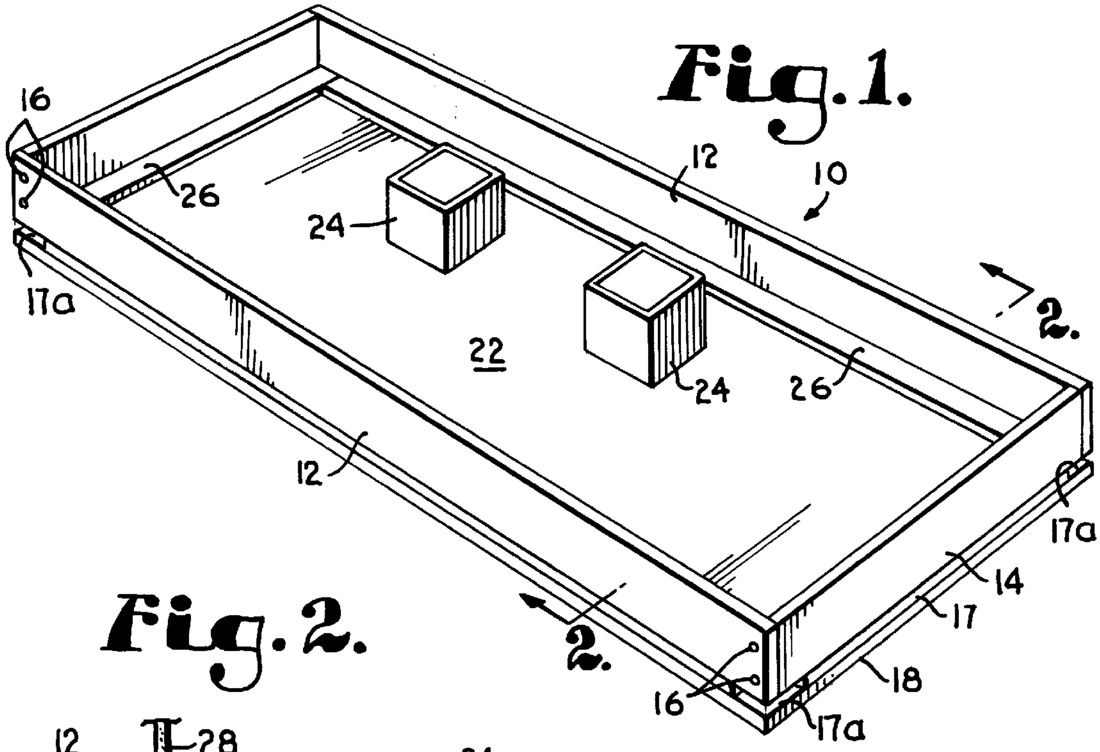
Fig. 1.
Fig. 2.
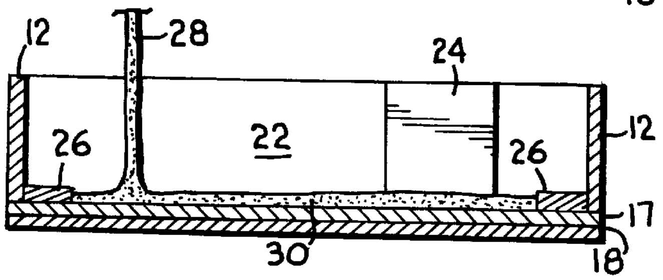
Fig. 3.
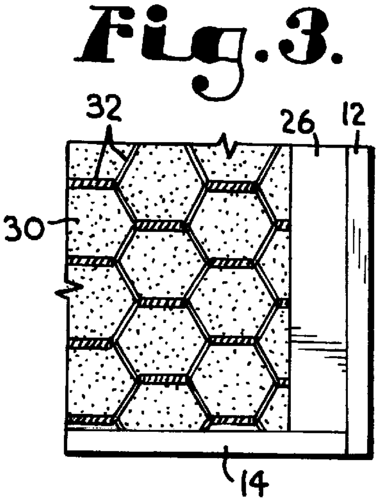
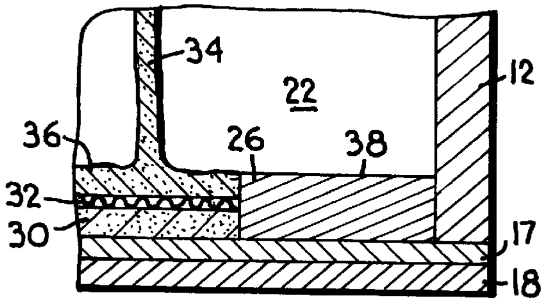
Fig. 4.
Fig. 5.
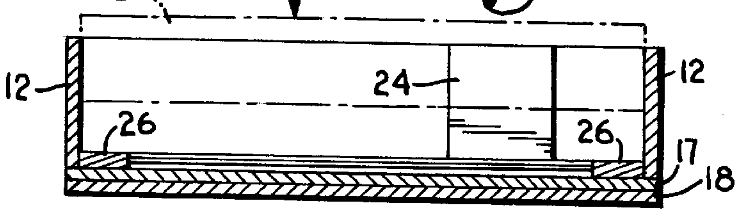

Fig. 9.
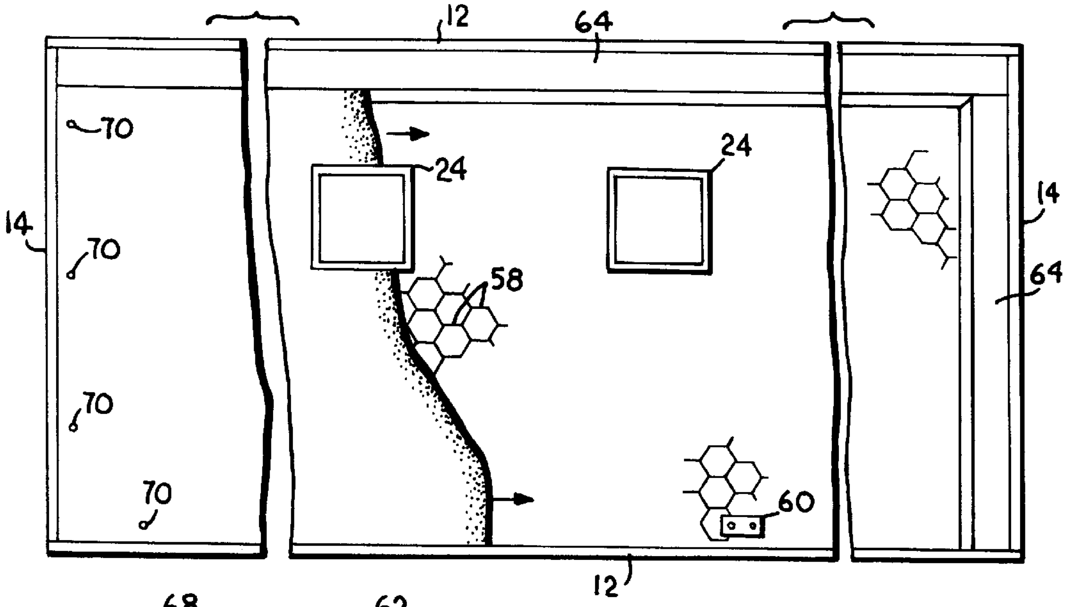
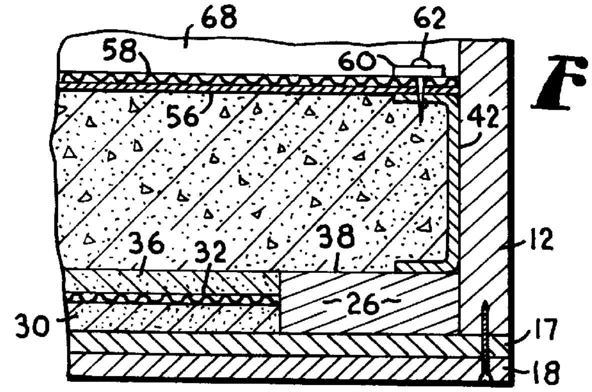
Fig. 10.
Fig. 12.
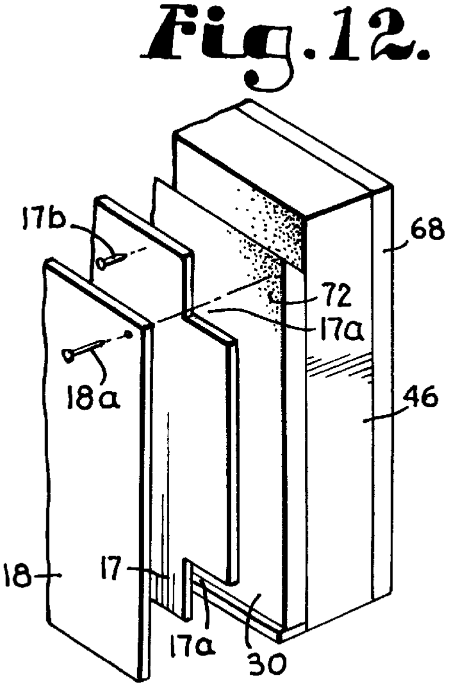
Fig. 11.
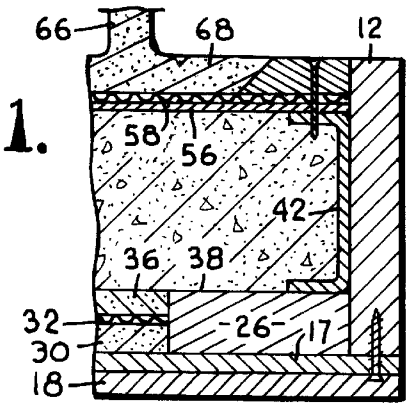

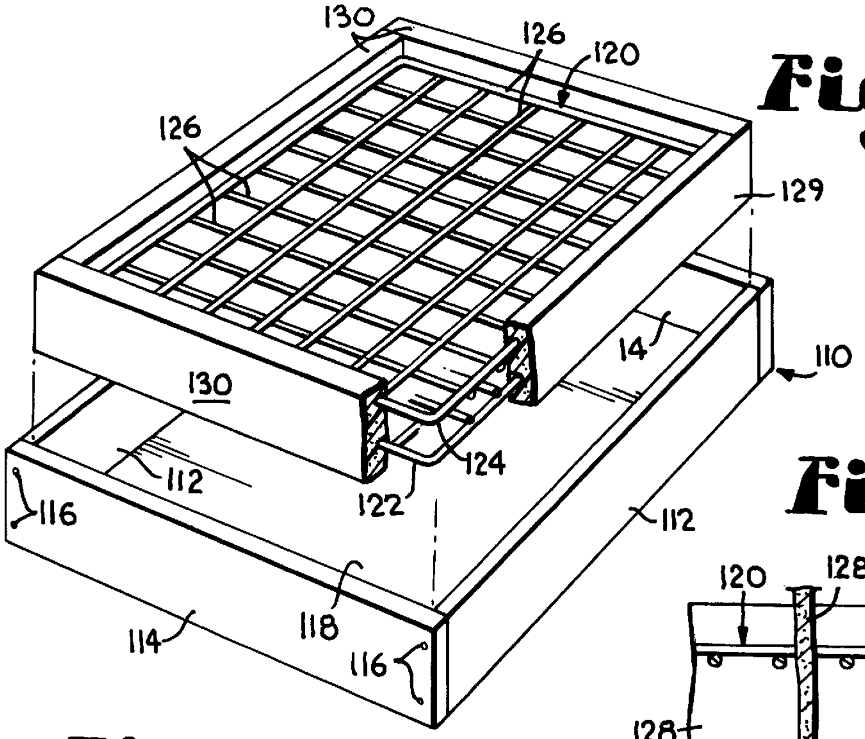
Fig.13.
Fig.14.
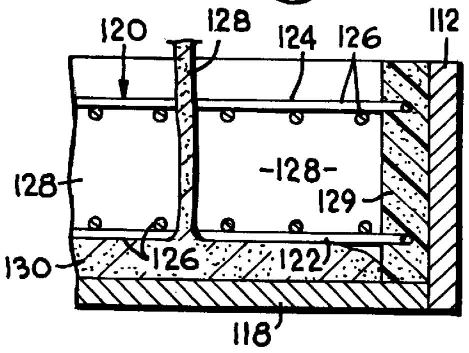
Fig.15.
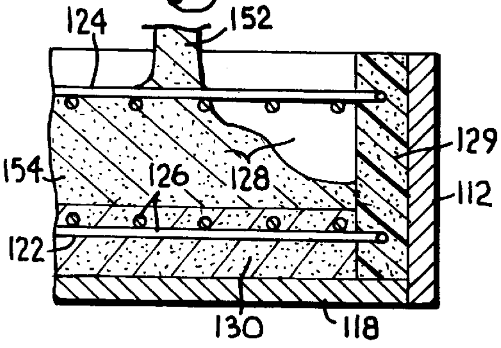
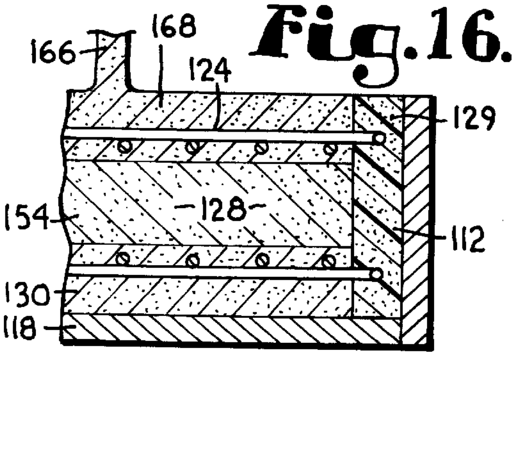
Fig.16.
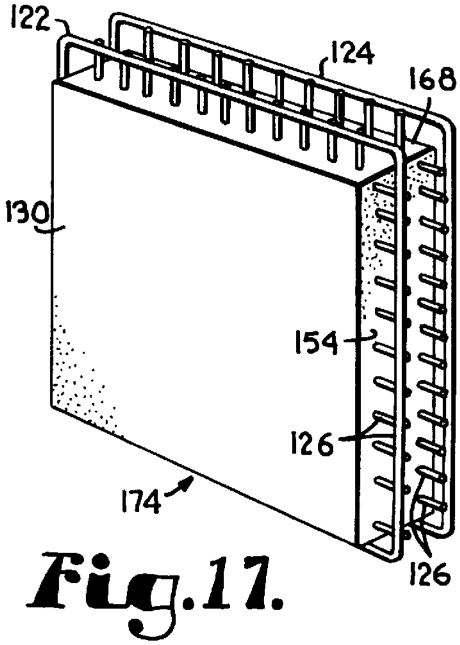
Fig.17.

MOLDED BUILDING PANEL AND METHOD OF CONSTRUCTION

FIELD OF THE INVENTION

This invention relates generally to building panels and deals more particularly with a method for molding wall panels and to the construction of the molded panels.

BACKGROUND OF THE INVENTION

In the construction of buildings, systems have been developed for prefabricating building panels and shipping them to the building site where they are assembled by construction workers. However, these types of systems have not been entirely satisfactory and have failed to a large extent to displace traditional "stick built" construction techniques. One problem is that assembling the prefabricated panels and connecting them together requires cranes and other heavy equipment, as well as costly on-site labor. The materials of which prefabricated panels are constructed have been less than satisfactory in many respects, including their relatively high cost, heavy weight, lack of effective thermal insulation, structural deficiencies, and lack of resistance to fire, weather and insects. The panels that have been proposed in the past have also been difficult to finish other than by employing conventional techniques and materials.

SUMMARY OF THE INVENTION

The present invention is directed to a new building panel construction and to a unique method of molding panels either on-site or at a factory. The method is characterized by simplicity and makes use of uniquely formulated materials which provide the panels with structural strength, highly effective insulating properties, light-weight, surface layers that can be finished in virtually any desired manner, and resistance to fire, weather and insects.

In accordance with one aspect of the invention, a building panel can be molded by workers at the building site. A mold that has the desired panel first receives a relatively thin inside surface layer which is poured on the base of the mold in the form of a cement-gypsum blend mixed with a liquid catalyst. After the inside surface layer has hardened sufficiently, a reinforcing wire mesh is added to the mold, followed by pouring of a fire resistant layer which may be a blend of cement, gypsum and perlite mixed with a liquid catalyst. A metal stud framework is installed in the mold after the fire resistant layer has hardened, and insulation is applied to fill the stud cavities. Building paper and mesh reinforcement are secured to the stud framework, and an outer layer is then poured into the mold. Alternatively, another fire resistant layer may optionally be applied between the building paper and the mesh. Screws are used to attach the outside layer to the framework and, after the bottom of the mold has been removed, screws are used to fasten the inside layer to the studs.

It is a particular feature of the method of the present invention that mold inserts can be used in the mold in order to maintain one or more marginal areas of the framework exposed. This facilitates attachment of the molded panels to additional wall panels or to other structures.

Another important feature of the invention is that the mold has a specially constructed double panel bottom structure. This allows one of the bottom panels to be removed and screws to be applied through cutouts in the other panel to attach the inside surface layer to the framework before the second panel is removed.

In an alternative embodiment of the invention, a wire grid which is inserted into a mold includes two wire mesh panels spaced apart and parallel to one another. One or more edges of the grid are imbedded in spacers which maintain the wire mesh panels at the desired locations and also maintain the grid edge or edges exposed to facilitate their attachment to additional panels or other structures. A surface layer is poured into the mold to the depth of the lower grid panel and allowed to harden sufficiently before an insulating layer is poured into the mold to the depth of the other wire mesh grid panel. The final surface layer is poured last after the insulating layer has hardened. The result is a composite panel which is light in weight, highly insulating, and structurally strong by reason of the materials that are used for molding the different layers and the strength and reinforcement supplied by the wire gridwork.

Other and further objects of the invention, together with the features of novelty appurtenant thereto, will appear in the course of the following description.

BRIEF DESCRIPTION OF THE DRAWINGS

In the accompanying drawings which form a part of the specification and are to be read in conjunction therewith and in which like reference numerals are used to indicate like parts in the various views:

FIG. 1 is a perspective view of a mold which is used for the construction of a molded building panel in accordance with one embodiment of the present invention, with spacers and plugs inserted into the mold;

FIG. 2 is a sectional view taken generally along line 2—2 of FIG. 1 in the direction of the arrows and showing an inside surface layer being poured into the mold;

FIG. 3 is a fragmentary top plan view of one corner portion of the mold showing a wire reinforcing mesh applied to the inside surface layer;

FIG. 4 is a fragmentary sectional view on an enlarged scale showing a fire resistant layer being poured into the mold on top of the reinforcing mesh;

FIG. 5 is a sectional view similar to FIG. 2 diagrammatically showing the insertion of a rigid stud framework into the mold;

FIG. 9 is a top plan view showing an outside surface layer applied to the mold on the building paper and reinforcing mesh, with the break lines indicating continuous lengths;

FIG. 10 is a fragmentary sectional view showing the application of the outside surface layer to the mold;

FIG. 11 is a fragmentary sectional view similar to FIG. 10 and showing application of the outside surface layer to the mold and screws attaching the outside layer to the framework;

FIG. 12 is a fragmentary perspective view showing removal of the base panels from the mold;

FIG. 13 is a perspective view showing a wire grid with marginal spacers being applied into a mold in accordance with an alternative embodiment of the present invention, with portions broken away for purposes of illustration;

FIG. 14 is a fragmentary sectional view showing the wire grid installed in the mold and one surface layer being poured into the mold.

FIG. 15 is a fragmentary sectional view similar to FIG. 14 and showing insulating being poured into the mold;

FIG. 16 is a fragmentary sectional view similar to views 14 and 15 but showing the other surface layer being poured into the mold.; and FIG. 17 is a prospective view showing a finished panel molded in accordance with the process depicted in FIGS. 13–16.

DETAILED DESCRIPTION OF THE INVENTION

Figure 6:
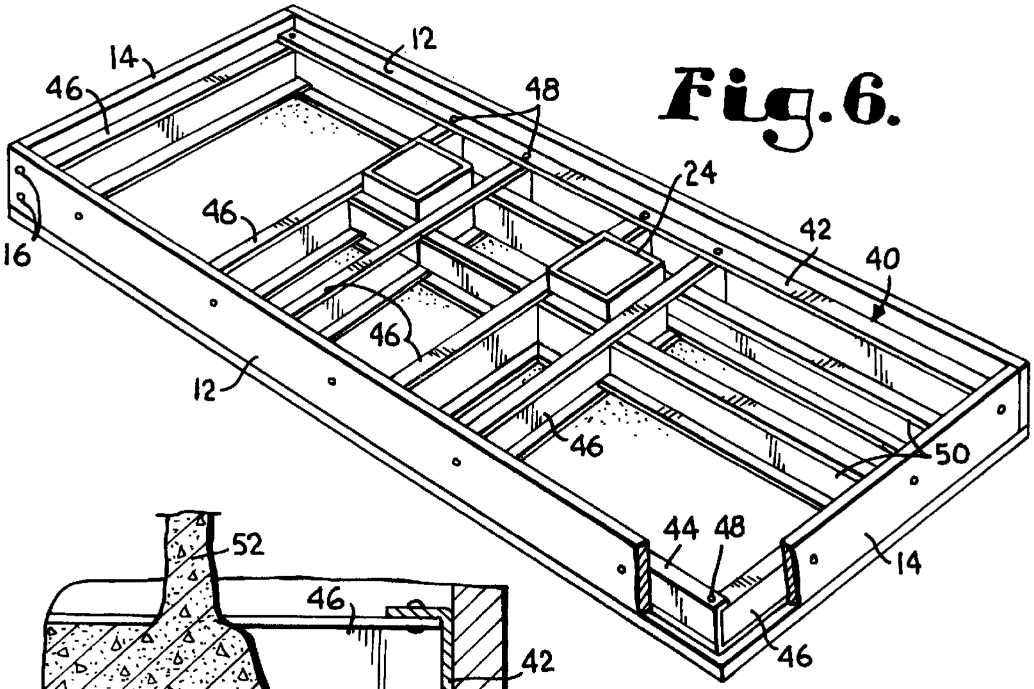
FIG. 6 is a perspective view showing the stud framework inserted into the mold, with portions broken away for purposes of illustration.

Referring now to the drawings in more detail and initially to FIG. 1, numeral 10 generally designates a mold which is constructed for use in the fabrication of a precast building panel in accordance with one embodiment of the present invention The mold 10 is generally rectangular and includes opposite sides 12 and opposite ends 14 which are connected with the side 12 by a plurality of screws 16 or other removable fasteners. The mold 10 has a pair of flat base panels 17 and 18 which cover the entire bottom of the mold. The mold 10 provides a rectangular mold cavity 22 which has the size desired for the building panel which is molded in it. The sides 12 and ends 14 have a common width which may be selected to coincide with the desired thickness of the finished building panel.

The special construction of the double panel base of the mold is best illustrated in FIG. 12. The uppermost panel 17 has a size and shape to nearly cover the entire bottom of the mold 10 and is provided with cutouts 17*a* in its four corner areas or elsewhere. Screws 17*b* are used to detachably connect panel 17 to the sides 12 and ends 14 of the mold, with the mold interior being accessible through the cutouts 17*a*. The lower panel 18 has the same size and shape as panel 17 but is devoid of cutouts. Panel 18 is a solid panel which covers the entire bottom of the mold immediately beneath panel 17 and is connected to the sides 12 and ends 14 by screws 18*a* or other detachable fasteners.

Plugs such as the square plugs 24 may be installed on the base panel 17 at the desired locations to form windows or other wall openings such as doors and the like. One or more mold inserts 26 may be inserted into the mold to extend along one or more of the sides 12 and/or one or more of the ends 14. The purpose for the inserts 26 is to maintain one or more marginal areas of the framework for the building panel exposed, as will be explained more fully.

The mold 10 may be used either at a factory at which building panels are fabricated or at a building site where a building is to be constructed from a number of the panels that are molded on-site. The sides 12, ends 14 and base panels 17 and 18 may be constructed of any suitable material such as wood. Preferably, the upper surface of the base panel 17 is smooth in order to provide for a smooth surface on the inside surface layer of a panel which is molded directly on the base panel 17.

The initial step in the process of molding building panels in the mold 10 involves pouring into the mold a fluid material 28 (FIG. 2) which is poured onto the base panel 17 to a selected depth such as ½ inch, for example. The material 28 forms the inside surface layer 30 of the panel once it has been allowed to set and harden. Preferably, the material 28 is a formulation of gypsum, cement, perlite and suitable catalysts. The gypsum is preferably a high density gypsum composition which is commercially available from U.S. Gypsum Company under the trademark HYDROSTONE. The cement is preferably Portland cement. The perlite may be in the form of an expanded perlite aggregate which may have particles classified as number six size. The catalyst is mixed with water and is preferably a styrene acrylic catalyst commercially available from Geobond International, Inc. as "Geobond Catalyst 86". The catalyst is preferably mixed with water such that the liquid portion of the material 28 constitutes about 91% water and about 9% catalyst. The dry component of the material 28 may include approximately equal parts by weight cement, gypsum and perlite, although the proportions can vary depending on the desired properties of the surface layer 30.

The liquid and dry components of the material 28 are mixed together and poured into the mold to the desired depth. The surface layer 30 is then allowed to set for approximately 15–20 minutes until it has hardened sufficiently for the process to continue.

As shown in FIG. 4, the layer 30 is preferably about ½ as thick as the insert 28. A wire reinforcing mesh 32 is then inserted into the mold on top of the layer 30, followed by application of a fluid material 34 on the mesh 32 to form a fire resistant layer 36. The layer 36 has a thickness such that its upper surface is substantially coincident with a flat ledge 38 (see FIG. 4) formed on top of the insert 26.

The material 34 preferably has a dry component which includes approximately 41% Portland cement, 37% HYDROSTONE gypsum, 6.3% perlite powder and 15.7% perlite aggregate by weight. The liquid component of the material 34 is preferably a styrene acrylic catalyst such as "Geobond Catalyst H6". The catalyst is mixed with water such that the liquid component of the material 34 is approximately 91% water and approximately 9% catalyst. The liquid and dry components of the material 34 are mixed together and poured into the mold to form the fire resistant layer 36. The fire resistant layer may be approximately ½ inch thick, although other thicknesses are possible. The reinforcing mesh 32 is embedded between the layers 30 and 36 to provide structural reinforcement for the inside surface portion of the panel. Layer 36 normally hardens sufficiently to allow the process to proceed after it has been allowed to set for approximately 15–20 minutes.

The primary structural strength of the finished wall panel is provided by a metal stud framework which is generally identified by numeral 40. As best shown in FIG. 6, the stud framework 40 includes metal top and bottom tracks 42 and 44 and a plurality of upright metal studs 46 which extend between the top and bottom tracks and are secured to them by screws 48 or other fasteners. The framework 40 may include additional cross pieces 50 which extend between adjacent studs for bracing purposes, especially in the vicinity of the window openings formed by the plugs 24.

Figure 7:
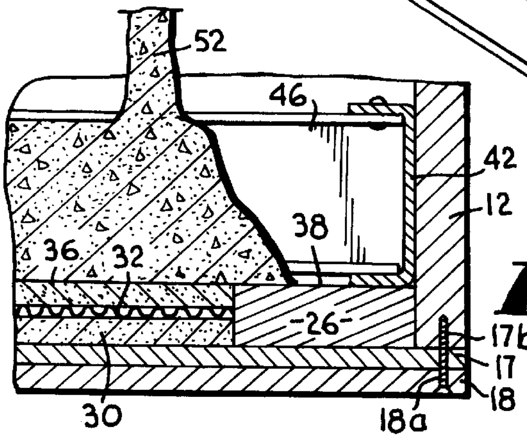
FIG. 7 is a fragmentary sectional view on an enlarged scale showing insulating material being poured into the mold to fill the stud cavities of the framework.
Figure 8:
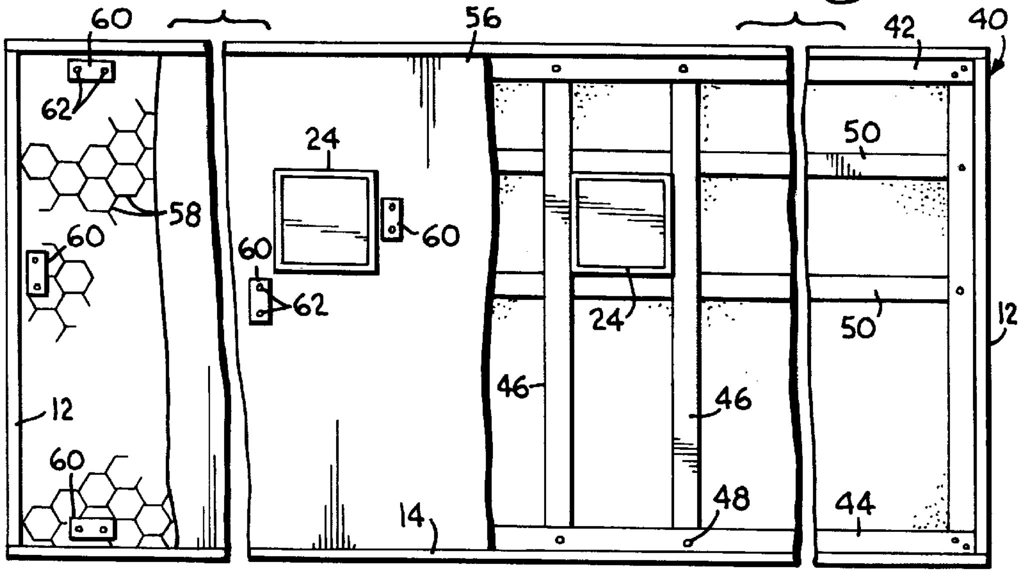
FIG. 8 is a top plan view showing building paper and wire reinforcing mesh applied on the stud framework and secured to it, with the break lines indicating continuous length.

The framework 40 has a size to fit closely within the mold against the sides 12 and ends 14. As shown in FIG. 7, one or more edge portions of the framework 40 rest directly on the ledge surfaces 38 provided by the inserts 26 which is placed in the mold. The marginal areas of the framework 40 which rests on the inserts 26 project beyond the layers 30 and 36 and are thus exposed at the edge of the wall panel, as will be explained more fully.

After the framework 40 is in place in the mold, insulating material 52 (see FIG. 7) can be poured into the mold to fill the stud cavities formed between the studs 46 of the framework. Alternatively, the insulating material 52 can be applied to fill the stud cavities before the framework 40 is inserted into the mold. In any event, the material 52 provides an insulating layer 54 which fills all of the stud cavities.

The material 52 preferably has a dry component that is formed by cement, gypsum, perlite powder and perlite aggregate. Preferably, the cement is present in the amount of approximately 29.25%, the gypsum is present in the amount of about 26.25%, the perlite powder is present in the amount of about 4.57% and the perlite aggregate is present in the amount of approximately 39.93% by weight. The dry portion of material 52 is mixed with a liquid portion which is composed of approximately 91% water and approximately 9% styrene acrylic catalyst which may be "Geobond Catalyst H6".

After the framework 40 has been applied and the insulating layer 54 has hardened, a sheet of building paper such as tar paper 56 is applied on the framework 40. A wire reinforcing mesh 58 is then laid on the tar paper 56. The tar paper 56 and reinforcing mesh 58 are secure to the framework 40 by a plurality of metal plates 60 which are laid on top of the mesh 58 and secured to the metal studs 46 and tracks 42 and 44 of the framework by screws 62 or other fasteners.

As shown in FIG. 9, one or more inserts 64 may be inserted into the mold on top of the framework 40 to extend along one or more of the sides 12 and/or one or more of the ends 14 if it is desired to maintain that side of the framework edge exposed.

As shown in FIG. 11, a fluid material 66 is poured on top of the tar paper 56 and mesh 58 to form an outside surface layer 68 of the panel. The material 66 is poured to the desired depth which may coincide with the level of the upper edges of the sides 12 and ends 14. The material 66 may be the same as the material 28 used to form the inside surface 30. The surface of layer 68 should be smoothed using standard techniques.

After the layer 68 has been allowed to set along enough to harden, screws 70 (FIG. 11) are applied through layer 68 and threaded into the studs 46 and the tracks 42 and 44 and cross pieces 50 to secure layer 68 to the framework 40. Thereafter, the mold 10 is tilted upwardly, and, as best shown in FIG. 12, the screws 18*a* are removed to detach the base panel 18 from the mold sides and ends, thus exposing parts of the inside surface layer 30 through the cutouts 17*a* in panel 17. Screws 72 (see FIG. 12) are then applied through cutouts 17*a* to the surface layer 30 and into the corner areas of the framework 40 to initially secure the inside surface layer 30 to the framework 40. The screws 72 hold the surface layer 30 to the framework 40 sufficiently to allow panel 17 to be removed by removing screws 17*b*. The entire surface of layer 30 is then exposed to permit it to be securely fastened to the framework 40 by applying additional screws through layer 30 and into the studs 46, tracks 42 and 44 and cross pieces 50.

An optional layer of fire resistant material can be applied between the framework 40 and the outside surface layer 68. To construct the panel in this fashion, the reinforcing mesh 58 is not applied directly to the tar paper 56. Instead, the additional fire resistant layer is poured onto the tar paper 56 and may be the same material used for the other fire resistant layer 36. The reinforcing mesh 56 is then laid on top of the fire resistant layer (after it has hardened sufficiently), and the surface layer 68 is poured on the mesh 58. Again, screws 72 are used to secure the surface layer 68 and the additional fire resistant layer to the framework 40.

The screws 16 can be removed to detach the sides 12 and the ends 14 from one another so that the sides and ends of the mold can be removed from the molded building panel. The plugs 24 and inserts 26 and 64 are also removed. The marginal area or areas of the framework 40 adjacent to the insert or inserts are exposed so that they can be readily attached to adjacent wall panels or other structures. It is contemplated that the use of inserts can form male/female joints between adjacent panels in order to facilitate finishing of the wall surfaces. In addition, exposure of the edge portions of the wall facilitates the construction of corners and may be desired at intersections with floor and/or ceiling materials.

The insulating layer 54 is normally the thickest layer in the composite building panel, and its light weight provides a low overall weight for the panel. At the same time, layer 54 is highly effective in providing thermal insulating properties due to the materials of which it is constructed. The fire resistant layer or layers are likewise highly effective in resisting fires, while the surface layers 30 and 68 are resistant to insects and weather and can be finished in any manner desired. The framework 40 provides adequate structural strength for load bearing capabilities, and the wall panel constructed in accordance with the process of the present invention is thus inexpensive, strong, light weight, thermally insulated and easily finished.

Referring now to FIGS. 13–17, another aspect of the present invention involves molding of an alternative embodiment of a building panel. A rectangular mold 110 includes parallel opposite sides 112 and parallel opposite ends 114 which are connected with the sides by screws 116 or other removable fasteners. The bottom of the mold 110 is covered by a base 118 which may be screwed or otherwise secured to the sides 112 and ends 114.

The process of constructing a panel in accordance with this embodiment of the invention involves inserting into the mold 110 a metal grid which is generally identified by numeral 120 and which includes a pair of parallel meshwork panels 122 and 124. Each of the panels 122 and 124 is generally rectangular and includes a plurality of interconnected crossing wires 126. As shown in FIGS. 14–16, the wires 126 in the lower panel 122 are connected with the wires 126 in the upper panel 124 by a plurality of connecting wires 128 which extend between panels 124 and 126 at a slight incline. The panels 122 and 124 may be spaced apart as desired and are normally spaced apart approximately 3 inches.

One or more of the edges of the grid 120 is embedded in a detachable spacer 130. Each spacer 130 is applied to the corresponding edge of the grid 120 and extends along the corresponding side 112 or end 114 of the mold when the grid is installed in the mold. The spacers 130 may be constructed of a foam material or any other suitable material.

The grid 120 is inserted into the mold 110 with the spacer or spacers 130 in place on one or more edges of the grid. The spacers 130 locate the lower gridwork panel 122 at the desired elevation above the base 118 of the mold and also maintain selected edges of the grid 120 exposed in the completed building panel, as will be explained more fully.

After the grid 120 and the spacers 130 have been installed in the mold, a fluid material 128 (FIG. 14) is poured into the mold to form a surface layer 130 of the building panel. The fluid material 128 may be identical to the material 28 described for the layer 30 in the embodiment shown in FIGS. 1–12. The layer 130 is preferably poured to a depth slightly above the level of the lower meshwork panel 122 such that panel 122 is barely covered by layer 130. However, the depth of the layer 130 can vary.

After layer 130 has been allowed to set long enough to harden, an insulating material 152 is poured in fluid form into the mold to provide an insulating layer 154. The material 152 may be identical to the material 52 described previously. Preferably, the layer 154 is poured to a depth slightly below the level of the upper meshwork panel 124 such that the insulating layer 154 essentially fills the entire space between and including the panels 122 and 124. The connecting wires 128 are embedded in the insulating layer 154.

After the insulating layer 154 has been allowed to set long enough to harden (approximately 1–1½ hour in most cases), a fluid material 166 is poured into the mold to form another surface layer 168. The material 166 may be identical to the material 128. Once the surface layer 168 has hardened sufficiently, the screws 116 can be removed to disconnect the sides 112 and the ends 114 of the mold so that the sides, ends and base 118 can be disassembled to release from the mold the composite building panel 174 (FIG. 17). The spacer or spacers 130 can be removed from the edge portions of the panel 174, and it is noted that the grid 120 is exposed along the edge portions formerly occupied by the spacers 130. The exposed portions of the grid can be tied to similarly exposed portions of adjacent panels by wire ties or other fasteners to facilitate assembly of adjacent panels into a wall structure. The exposed edge portions of the panel 174 also facilitate formation of other intersections such as corners and intersections with floor and ceiling materials.

Suitable wall and finishing materials can be applied to the connected edge portions of adjacent panels or other structures in the finished walls construction.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A process of constructing a building panel, comprising the steps of:

applying into a mold having a removable base and a preselected shape a fluid material comprising gypsum and cement which is adapted to harden after being allowed to set, said fluid material being applied in an amount to cover said base to a selected thickness to form a first surface layer of said panel;

installing reinforcing mesh into the mold to reinforce said first surface layer of the panel;

inserting into the mold a rigid structural framework after said fluid material has set;

inserting into the mold building paper and reinforcement;

securing said building paper and reinforcement to said framework;

applying into the mold a fluid formulation comprising gypsum and cement which is adapted to harden after being allowed to set, said fluid formulation being applied in an amount to cover said framework to a selected thickness to form a second surface layer of said panel;

mechanically attaching said second surface layer to said framework after setting of said formulation;

removing said base from the mold; and mechanically fastening said first surface layer to said framework.

2. A process as set forth in claim 1, including the step of substantially filling spaces of said framework with insulation.

3. A process as set forth in claim 1, including the step of substantially filling spaces of said framework with insulation before the framework is inserted into the mold.

4. A process as set forth in claim 1, including the step of substantially filling spaces of said framework with insulation after the framework has been inserted into the mold.

5. A process as set forth in claim 4, wherein said insulation is poured into said spaces in fluid form and allowed to set and harden before said building paper and reinforcement are inserted into the mold.

6. A process as set forth in claim 1, wherein said securing step comprises mechanically fastening said building paper and reinforcement to said framework.

7. A process as set forth in claim 1, wherein said step of mechanically attaching comprises applying threaded fasteners through said second surface layer into said framework.

8. A process as set forth in claim 1, wherein said step of mechanically fastening comprises applying threaded fasteners through said first surface layer into said framework.

9. A process as set forth in claim 1, including the step of providing said mold insert which extends along a margin of the mold and which presents a ledge along said margin, said ledge having an upper surface defining a level of the ledge and said framework having a margin, and wherein:

said step of applying said fluid material comprises applying said fluid material to a depth substantially equal to the level of said ledge; and said step of inserting said framework comprises inserting said framework with said margin thereof located on said ledge, whereby said margin of the framework projects outwardly beyond said first surface layer.

10. A process as set forth in claim 9, including the step of providing said mold with a second mold insert extending on said building paper and reinforcement along said margin of the mold, whereby said margin of the framework projects outwardly beyond said second surface layer.

11. A process as set forth in claim 1, including the step of adding a fire resistant layer to the mold after said step of installing said reinforcing mesh and before the step of inserting said framework, said fire resistant layer being a fluid material adapted to harden after being allowed to set.

12. A process as set forth in claim 11, including the step of adding a second fire resistant layer to the mold between said building paper and reinforcement, said second fire resistant layer being a fluid material adapted to harden after being allowed to set.

13. A process as set forth in claim 1, wherein said base includes a first base panel having cutouts therein through which said first surface layer is accessible and a second base panel covering the bottom of said first base panel including said cutouts and wherein said step of removing said base from the mold comprises:

removing said second base panel from the mold to expose said cutouts;

applying fasteners through said cutouts and through said first layer into the framework; and removing said first base panel from the mold prior to effecting said step of mechanically fastening said fir&t surface layer to said framework.

14. A process of constructing a building wall panel at the site of a building to be constructed, said process comprising the steps of:

providing a mold at said site having a selected shape and a removable base;

applying, to a selected thickness in the mold, a first surface layer which is applied as a formulation of gypsum, cement and a catalyst which formulation is applied in fluid form and is adapted to harden after being allowed to set;

installing reinforcing mesh into the mold;

applying, to a selected thickness in the mold, a fire resistant formulation of gypsum, cement and a catalyst which formulation exhibits resistance to fire and is applied in a fluid form which is adapted to harden after being allowed to set to form a fire resistant layer;

inserting a rigid structural framework comprising metal studs into the mold onto said fire resistant layer after said fire resistant layer has hardened;

inserting into the mold and onto said framework building paper and reinforcement;

securing said building paper and reinforcement to said studs;

applying, to a selected thickness in the mold, a second surface layer which is applied as a formulation of gypsum, cement and a catalyst which formulation is applied in a fluid form and is adapted to harden after being allowed to set;

mechanically attaching said second surface layer to said framework after said second layer has set;

removing said base from the mold; and mechanically fastening said first surface layer to said framework.

15. A process as set forth in claim 14, including the step of substantially filling spaces of said framework with insulation.

16. A process as set forth in claim 14, including the step of adding a second fire resistant layer to the mold between said building paper and reinforcement, said second fire resistant layer being a fluid material adapted to harden after being allowed to set.

17. A process as set forth in claim 14, including the step of providing said mold with a mold insert which extends along a margin of the mold and which presents a ledge along said margin, said ledge having an upper surface defining a level of the ledge and said framework having a margin, and wherein:

said step of applying said fire resistant formulation comprises applying said fire resistant formulation to a depth substantially coincident with the level of said ledge; and said step of inserting said framework comprises inserting said framework with said margin thereof located on said ledge, whereby said margin of the framework projects outwardly beyond said first surface layer.

18. A process as set forth in claim 17, including the step of providing said mold with a second mold insert extending on said building paper and reinforcement along said margin of the mold, whereby said margin of the framework projects outwardly beyond said second surface layer.

19. A process as set forth in claim 14, wherein said base includes a first base panel having cutouts therein through which said first surface layer is accessible and a second base panel covering the bottom of said first base panel including said cutouts and wherein said step of removing said base from the mold comprises:

removing said second base panel from the mold to expose said cutouts;

applying fasteners through said cutouts and through said first layer into the framework; and removing said first base panel from the mold prior to effecting said step of mechanically fastening said first surface layer to said framework.

* * * * *